US009228684B2

(12) United States Patent
Knapp

(10) Patent No.: US 9,228,684 B2
(45) Date of Patent: Jan. 5, 2016

(54) SEALING GASKET

(75) Inventor: Mark Knapp, Ravenna, OH (US)

(73) Assignee: Springseal, Inc., Streetsboro, OH (US)

(*) Notice: Subject to any disclaimer, the term of this patent is extended or adjusted under 35 U.S.C. 154(b) by 483 days.

(21) Appl. No.: 13/458,695

(22) Filed: Apr. 27, 2012

(65) Prior Publication Data
US 2012/0274031 A1 Nov. 1, 2012

Related U.S. Application Data

(60) Provisional application No. 61/480,797, filed on Apr. 29, 2011, provisional application No. 61/559,284, filed on Nov. 14, 2011.

(51) Int. Cl.
F16L 25/00 (2006.01)
F16J 15/02 (2006.01)

(52) U.S. Cl.
CPC ........... F16L 25/0054 (2013.01); F16J 15/025 (2013.01)

(58) Field of Classification Search
USPC .................. 277/602, 616, 626, 627, 630, 637
See application file for complete search history.

(56) References Cited

U.S. PATENT DOCUMENTS

| 2,259,940 | A | | 10/1941 | Nathan | |
| 3,379,444 | A | | 4/1968 | Brummer et al. | |
| 4,182,519 | A | * | 1/1980 | Wilson | 277/616 |
| 4,223,895 | A | * | 9/1980 | Roberts et al. | 277/625 |
| D285,247 | S | | 8/1986 | Jornhagen | |
| 5,169,161 | A | * | 12/1992 | Jones | 277/615 |
| 5,288,087 | A | * | 2/1994 | Bertoldo | 277/616 |
| 6,299,176 | B1 | | 10/2001 | Guzowski et al. | |
| 6,336,640 | B1 | | 1/2002 | Knapp | |
| 6,343,623 | B2 | * | 2/2002 | Hegler | 138/109 |
| 6,367,802 | B1 | | 4/2002 | Knapp | |
| 6,550,775 | B2 | | 4/2003 | Knapp | |
| 7,469,905 | B2 | | 12/2008 | Knapp | |
| 7,513,536 | B2 | | 4/2009 | Corbett et al. | |
| 7,594,664 | B2 | | 9/2009 | Maskaliunas | |
| 7,731,884 | B2 | | 6/2010 | Knapp et al. | |
| 7,753,376 | B2 | | 7/2010 | Kondo et al. | |
| D631,948 | S | | 2/2011 | Yoshida et al. | |
| D638,522 | S | | 5/2011 | Yoshida et al. | |
| D696,751 | S | | 12/2013 | Beagen, Jr. | |
| D706,908 | S | | 6/2014 | Knapp | |
| 2005/0230972 | A1 | * | 10/2005 | Owen et al. | 285/337 |

(Continued)

OTHER PUBLICATIONS

Photograph of a gasket similar to the profile shown in U.S. Patent Publication No. 2008/0303224, 1 page. This product as shown and described in the photograph was on sale in the U.S. on or before Apr. 1, 2010.
Photograph of a gasket similar to the profile shown in U.S. Pat. No. 6,550,775, 1 page. This product as shown and described in the photograph was on sale in the U.S. on or before Apr. 1, 2010.

(Continued)

Primary Examiner — Vishal Patel
(74) Attorney, Agent, or Firm — Tarolli, Sundheim, Covell & Tummino LLP

(57) ABSTRACT

An annular sealing gasket for forming a sealing connection between a first tubular member and a second tubular member. The annular sealing gasket comprises a flexible sealing portion adapted to form a sealing connection between a first tubular member and a second tubular member and a body region adapted for supporting the flexible sealing portion and anchoring the annular sealing gasket to a secured connection. The body region further comprises spaced first and second conical legs extending convergingly away from the body region transversely from the flexible sealing portion.

21 Claims, 9 Drawing Sheets

(56) References Cited

U.S. PATENT DOCUMENTS

| | | | |
|---|---|---|---|
| 2008/0303224 A1* | 12/2008 | Knapp | 277/627 |
| 2009/0060635 A1* | 3/2009 | Jones et al. | 403/14 |
| 2009/0127852 A1* | 5/2009 | Sutton et al. | 285/374 |
| 2009/0206553 A1 | 8/2009 | Kanzaki | |
| 2010/0007090 A1 | 1/2010 | Kobayashi | |

OTHER PUBLICATIONS

Photograph of a gasket similar to the profile shown in U.S. Pat. No. 6,336,640, 1 page. This product as shown and described in the photograph was on sale in the U.S. on or before Apr. 1, 2010.

Photograph of a gasket, 1 page. This product as shown in the photograph was on sale in the U.S. on or before Apr. 1, 2010.

* cited by examiner

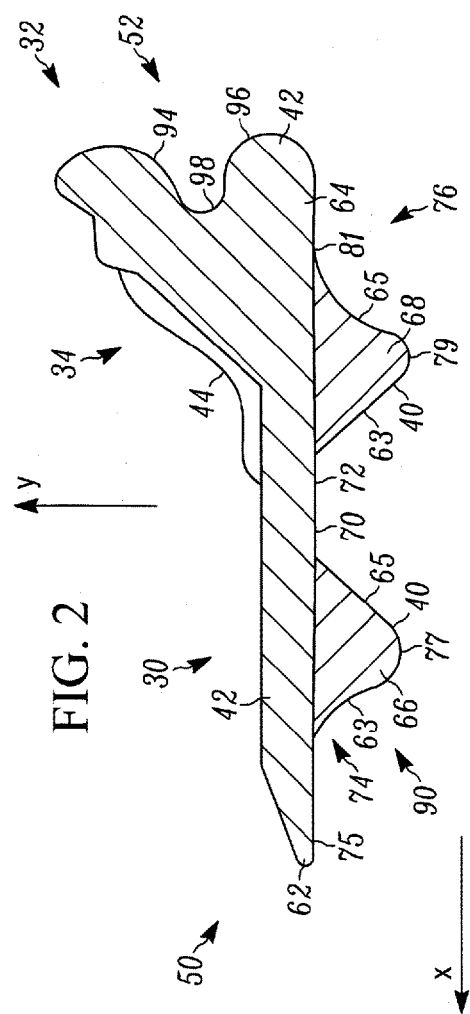
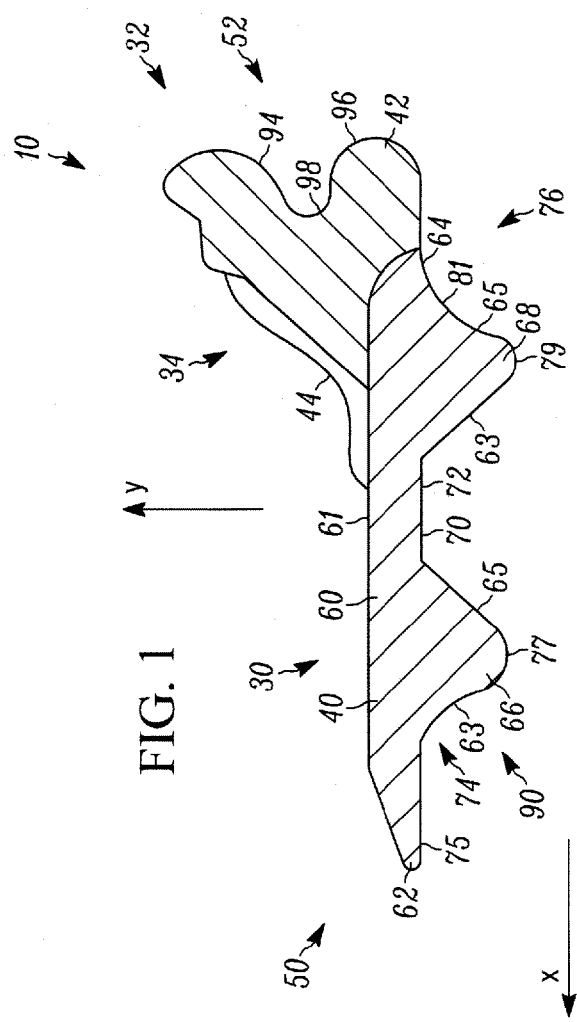

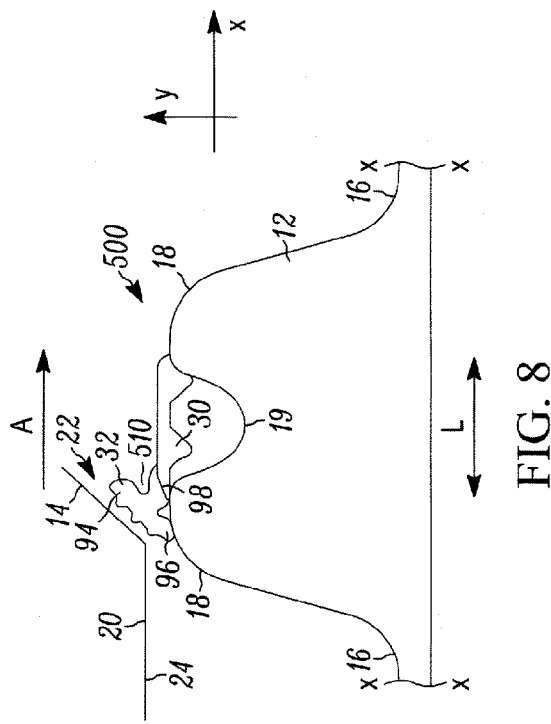
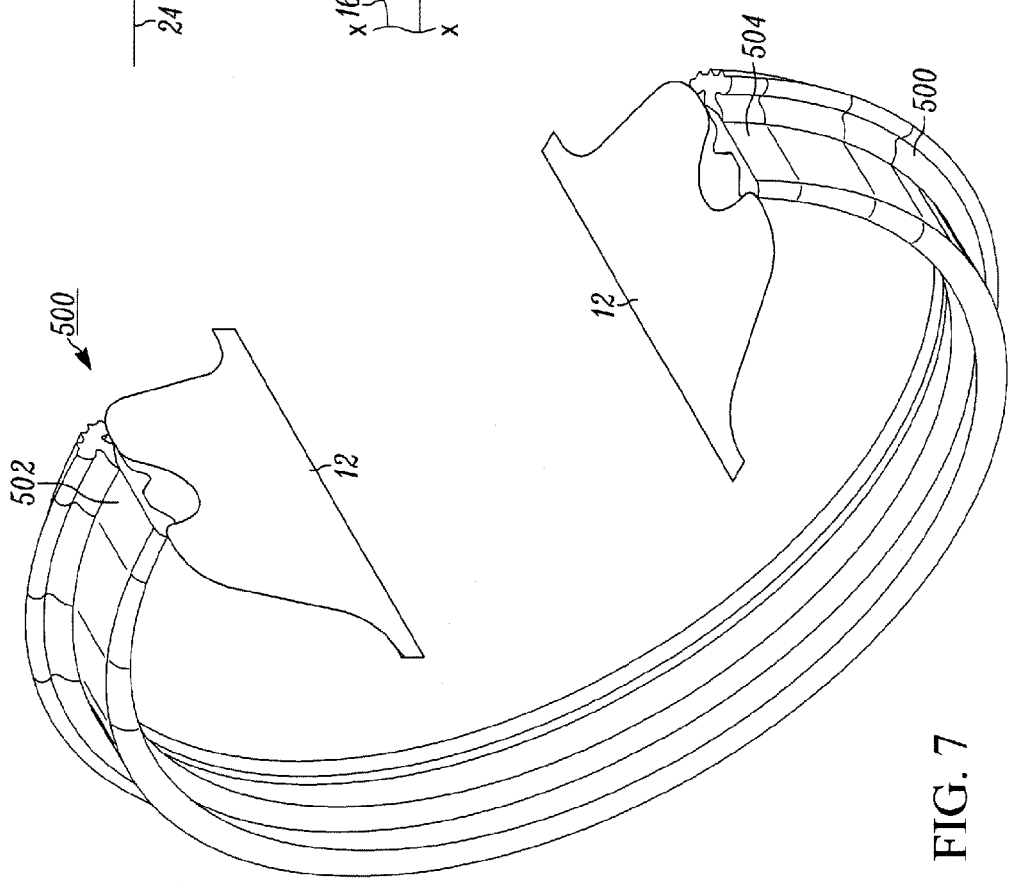
FIG. 8
FIG. 7

SEALING GASKET

CROSS REFERENCE TO RELATED APPLICATIONS

The following application is a Non-provisional patent application claims priority from currently pending U.S. Provisional Application 61/559,284 filed Nov. 14, 2011 entitled SEALING GASKET and currently pending U.S. Provisional Application 61/480,797 filed Apr. 29, 2011 entitled SEALING GASKET. The above-identified U.S. Provisional Patent Applications from which priority is claimed are incorporated herein by reference in their entireties for all purposes.

TECHNICAL FIELD

The present disclosure relates to a gasket and method of attaching the gasket to a first pipe member to form a fluid-tight connection between the gasket, first pipe member, and a second pipe member.

BACKGROUND

For the transport of fluids that includes both liquids and gases, it is desirable to form a fluid-tight sealed connection when jointing two or more pipe sections together. Numerous applications exist for transporting drain or storm, potable, or waste water using pipe sections fabricated from thermoplastic materials such as polyethylene, polypropylene, polyvinyl chloride (PVC), high density polyethylene (HDPE), and the like.

One common pipe configuration for the transport of fluids includes dual-wall corrugated piping, having a smooth interior wall, optimizing fluid flow characteristics and a corrugated outer wall for enhanced strength and durability. Connecting the dual wall corrugated pipe sections is generally achieved by installing an oversized end of a first corrugated pipe section referred to as a bell over a spigot located at the end of a second corrugated pipe section. Seated in the one of the many corrugated sections or annular grooves of the spigot's outer diameter is typically a gasket that assists in forming a fluid-tight seal between the pipe sections. One example of a gasket design for such application, as well as for other purposes includes U.S. Pat. No. 7,469,905 that issued Dec. 30, 2008 and assigned to SpringSeal, Inc. (Streetsboro, Ohio) entitled PERMANENTLY LUBRICATED FILM GASKET AND METHOD OF MANUFACTURE (hereinafter "the '905 patent"), which is incorporated herein by reference in its entirety. The elastomeric gasket contacts each of the pipe sections to form a sealed connection assembly between the pipe sections.

Typically, a large frictional force is encountered when the spigot and the gasket are inserted into the bell of the outer pipe section. As one end of the inner pipe is pushed into the enlarged end or bell of the outer pipe section's pipe connector, the gasket is at times, undesirably pulled from the groove by the large frictional force. When the pipe is not properly sealed, ground water may leak into the pipe or fluid may leak out of the pipe and contaminate the ground or area surrounding the pipe sections.

It is not uncommon for the joining sections of the corrugated pipe to be exposed to numerous forces causing stress to the gasket over the life of the connection. Such stress may allow the gasket to move from its desired location or allow debris to infiltrate the gasket seat, reducing the effectiveness of the sealing assembly connection.

SUMMARY

One example embodiment of the present disclosure includes an annular sealing gasket for forming a sealing connection between a first tubular member and a second tubular member. The annular sealing gasket comprises a flexible sealing portion adapted to form a sealing connection between a first tubular member and a second tubular member and a body region adapted for supporting the flexible sealing portion and anchoring the annular sealing gasket to a secured connection. The body region further comprises spaced first and second conical legs extending convergingly away from the body region transversely from the flexible sealing portion.

Another example embodiment of the present disclosure includes an annular sealing gasket for forming a sealing connection between a first tubular member and a second tubular member. The annular sealing gasket comprises a flexible sealing portion adapted to form a sealing connection between a first tubular member and a second tubular member. The annular sealing gasket also comprises a body region adapted for supporting the flexible sealing portion and anchoring the annular sealing gasket to a secured connection within a recess of one of the first and second tubular members during assembly. The body region has spaced first and second conical legs extending away from the body region. The annular sealing gasket includes a leading side that is covered first by the other of the first and second tubular members during assembly. The leading side of the annular sealing gasket is located opposite a trailing side. The flexible sealing portion is one of extruded and molded into the body region along the leading side.

Further example embodiment of the present disclosure includes an annular sealing gasket for forming a sealing connection between a first tubular member and a second tubular member, the annular sealing gasket comprises first and second flexible sealing portions adapted to form a sealing connection between a first tubular member and a second tubular member. The annular sealing gasket also comprises a body region adapted for supporting the flexible sealing portions and anchoring the annular sealing gasket to a secured connection within a recess of one of the first and second tubular members during assembly. The body region has spaced first and second conical legs extending away from the body region. The annular sealing gasket includes a leading side that is covered first by the other of the first and second tubular members during assembly. The leading side of the annular sealing gasket is located and spaced opposite a trailing side, the first flexible sealing portion being one of extruded and molded into the body region along the leading side and the second flexible sealing portion being one of extruded and molded into the body region along the trailing side.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 1 is a cross-sectional partial perspective view of an annular sealing gasket constructed in accordance with one example embodiment of the present disclosure;

FIG. 2 is a cross-sectional partial perspective view of an annular sealing gasket constructed in accordance with another example embodiment of the present disclosure;

FIG. 7 is a partial perspective view of an annular sealing gasket constructed in accordance with another example embodiment of the present disclosure, the annular sealing gasket being nested in recess of a first pipe member;

FIG. 8 is a sectioned elevation view of FIG. 7 illustrating a bell of a second pipe member approaching the annular sealing gasket;

DETAILED DESCRIPTION

Referring now to the figures generally wherein like numbered features shown therein refer to like elements having similar characteristics and operational properties throughout unless otherwise noted. The present disclosure relates to a gasket and method of attaching the gasket to a first pipe member to form a fluid-tight connection between the gasket, first pipe member, and a second pipe member.

Referring now to the figures and in particular to FIG. 1 is a cross-sectional partial perspective view of annular sealing gasket 10 constructed in accordance with one example embodiment of the present disclosure. The sealing gasket 10 provides a fluid-tight seal 200 (see FIG. 3) between a first tubular member 12 and second tubular member 14.

Figure 3:
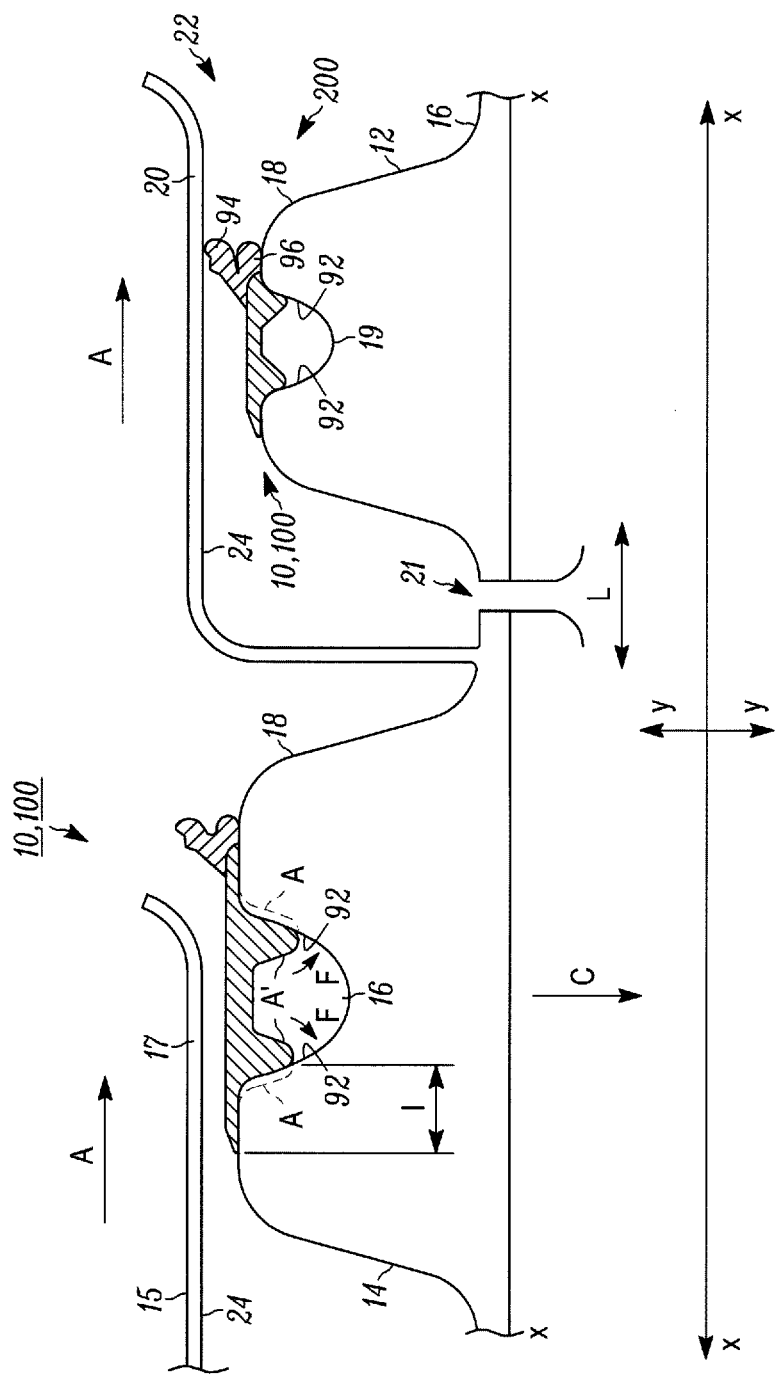
FIG. 3 is a cross sectional view of an annular gasket constructed in accordance with one example embodiment located in between two corrugations of a first pipe member and in a spigot of a first pipe member.

In the illustrated example embodiment of FIG. 3, the first tubular member 12 has a plurality of annular grooves or corrugations 16 and annular crowns 18. The second tubular member 14, includes a smooth annular section 20, such as a bell with a mouth 22 for receiving the first tubular member 12. The first and second tubular members 12 and 14 could extend several feet (not shown), but are sectioned in the illustrated figures at point X. The sealing gasket 10, is anchored in a spigot 19 located within a crown of the crest 18 formed by a single corrugation of the first pipe member 12.

In an alternative example embodiment, the sealing gasket 10, 100 is larger in size and spans over the corrugations of the second pipe member 14 as illustrated in FIG. 3 and forms a seal with a bell 20 of a second pipe member 15. Whether the sealing gasket 10 or 100 is positioned within the corrugations 16 or a spigot 19, a fluid-tight sealing connection 200 is achieved when an inner surface 24 of the bell compresses the sealing gasket 10, 100 between the two pipe members when the bell is advanced over the gasket in the direction of arrows "A".

Once the fluid-tight connection 200 is made between the annular conforming integral gasket 10 and tubular members 12, 14, fluids travel along the internal passage indicated by arrows L along the longitudinal axis "x" of the pipe members without leaking or entry of foreign objects or liquids. The ends of the two pipe members 12, 14 is illustrated by a gap 21, sealed from leaking by the annular sealing gasket 10.

The cross-sectional views of FIGS. 1 and 2 of the annular sealing gaskets 10, 100 are typically circularly joined by welding two ends of the gasket together to form a continuous gasket constructed to a specified diameter as a function of the gasket application. In the illustrated embodiment, the inner diameter of the integral gasket 10 is slightly smaller than the smallest outer diameter profile of tubular member 12 to provide an interference type compression fit within the corrugation 16 or spigot 19.

Further discussion of the process of welding ends of linear elastomeric gaskets to form the annular gaskets is found in U.S. Patent Publication Number 2007/0181654 filed Aug. 9, 2007 and assigned to SPRINGSEAL® (Streetsboro, Ohio) (hereinafter "the '654 Publication") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 10, 100 to be used for that application.

In exemplary embodiment illustrated in FIG. 1, the annular sealing gasket 10 is formed from three different materials separated into a body region 30, sealing portion 32, and lubricated portion 34. The body region 30 is made from a first material 40 having a relatively hard durometer. An example of a suitable material would be an elastomeric material having a durometer range for the body region 30 between 55 durometer on a Shore A scale and 50 durometer on a Shore D scale. Although elastomeric materials have been discussed, various polymers or rubbers having a durometer between 55 on a Shore A and 50 on a Shore D scale could also be used as a suitable first material without departing from the spirit and scope of the claimed invention. Yet another suitable example of a first material 40 includes high-density polyethylene ("HDPE").

The sealing portion 32 is made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. One company that makes ASTM F477 LH material is Advanced Elastomer Systems L.P. located in Akron, Ohio under their brand name SANTOPRENE®. Advanced Elastomer Sytems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could also be used as a suitable second material without departing from the spirit and scope of the claimed invention.

The sealing gasket 10 includes a leading side 50 and a trailing side 52. Extending along a portion of the leading side 50 is a third material 44 that forms a portion of the conforming gasket 10. The third material 44 comprises a permanently lubricated composition. The permanently lubricated material 44 could be made from any material having a low coefficient of friction "COF" and more specifically a level of point five (0.5) or less. An example of such suitable material for the lubricated material 44 includes polyethylene or polypropylene which has an approximate COF of point three (0.3). The lubricated material 44 is relatively thin, having a thickness range between 0.001" to 0.010" inches, preferably ranging between 0.003" to 0.005" inches thick, and is typically applied along a substantial portion of the leading side 50 that would be in contact with the bell 20 of, for example the second tubular member 14 during assembly. The lubricated material 44 can be extruded onto the sealing gasket 10 simultaneously with the first and second materials 40, 42, eliminating a need for a secondary operation for applying lubrication to the gasket. Further discussions relating to the application of a permanently lubricated material to a gasket is found in the '905 patent.

In an alternative embodiment, the third material and/or second material 44, 42, respectively are molded to the body region 30 of the first material 40. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material 44 is sprayed onto the leading side 50 of the sealing member 32. An example of a suitable sprayed lubricant includes poly(tetrafluoroethylene) or poly(tetrafluoroethene) (PTFE).

The sealing gasket 10 of FIG. 1 further comprises a spine 60 formed within and extending from the body region 30. The spine 60 of the body region 30 comprises a low planer upper surface 61 from a front end 62 to a rear end 64 that is integrated into the sealing portion 32. Part of and extending radially from the body region 30 are spaced first and second legs 66, 68 respectively. The legs 66 and 68 are inverted cones extending converging away through tapered sides 63, 65 from the spine 60, and are spaced by a medial region 70 at a lower surface 72 of the spine.

A front arcuate region 74 is formed about the body region 30 from a front lower surface 75 of the spine 60 to an apex 77 of the first leg 66. A rear arcuate region 76 is formed about the body region 30 from a rear lower surface 81 of the spine to an apex 79 of the second leg 68.

In the illustrated example embodiment of FIG. 1, the first leg 66 is radially shorter than the second leg 68. In another example embodiment, the first and second legs 66, 68, respectively are of equal length. In yet another example embodiment, the second leg 66 is radially shorter than the second leg 68.

In one example embodiment, the front lower surface 75, medial lower surface 70, and rear lower surface 81 of the spine are all substantially parallel and separated by first and second legs 66, 68, respectively. The substantially linear relationship provides a stiffening structure 90 resistant to lifting out of the corrugation 16 or spigot 19 during assembly of the pipe members 12, 14 with the sealing gasket 10 along a longitudinal direction represented by axis "x" in FIG. 1.

The sealing portion 32 of the gasket 10 comprises upper 94 and lower 96 members separated by a cavity 98. The sealing portion 32 is integrally molded or extruded with the body region 30 and lubricated portion 34. In one example embodiment, the gasket 10, 100 lacks a lubricated portion 34 formed by the third material 44.

The sealing portion 32 during assembly advantageously forms a fluid-tight connection between the first and second pipe members by their compressing of the upper member 94 toward the lower member 96. This compression sealing of the sealing member 32 is facilitated by the cavity 98, that allows for the relative movement of the upper member 94 toward the lower member 96 as illustrated in the assembled view of FIG. 3.

As the mouth 22 of the bell 20 passes over the gasket 10, 100, the inner surface 24 first engages the gasket at the sealing portion 32. And in one example embodiment, the inner surface 24 first engages the lubricated portion 34 that assists in the interconnection of the pipe members through reduced friction.

During assembly, the sealing gasket 10, 100 is stretched around the perimeter of the first pipe member 12 for nesting within the spigot 19 as shown in FIG. 3. Or alternatively, the sealing gasket 10, 100 is stretch around the perimeter of the second pipe member 14 for seating a corrugation 16 as also shown in FIG. 3. The sealing gasket 10, 100 is compressed into the corrugation 16 or spigot 19 in the lateral direction such that the legs 66, 68 are displaced from a first position A to a second position A' as shown in FIG. 3. This displacement, resulting from the double leg 66, 68, construction during insertion, advantageously provides gripping strength to the sealing gasket 10, 100. Resistant forces indicated by arrows "F" in FIG. 3 along with the compression force indicated by arrow "C" radially toward the lateral axis creates a wedging effect about the inner walls 92 of the corrugation 16 or spigot 19 of FIG. 3.

The double leg 66, 68 construction spaced by medial region 70 in addition to providing gripping strength to the gaskets 10, 100, also allows for proper seating of the gasket despite variations in the tolerances associated with the distance between inner walls 92. That is, a solid anchor structure would lack the gripping power and tolerance forgiveness found in the geometrical construct of the sealing gasket 10, 100 example embodiments of FIGS. 1 and 2.

The low profile of the front end 62 of the gaskets 10, 100 also allows for enhanced gripping of the corrugation 16 and/or spigot 19. In particular, the low profile design avoids frictional contact with the inner surface 24 of the bell 20 during assembly. As well, the lengthy lower spine surface 72 provides added holding strength during assembly resulting in part to the stiffening structure 90 from the substantially linear relationship about the legs.

Referring now to FIG. 2 is a sealing gasket 100 constructed in accordance with another example embodiment. Similarly numbered features and elements shown in FIG. 2 as that of FIG. 1 refer to like elements having similar characteristics and operational properties unless otherwise noted. The sealing gasket 100 differs in one aspect from the example embodiment of FIG. 1, in that the annular legs 66 and 68 are constructed from the first material 40 and the spine 60 and sealing member 32 are constructed from the second material 42. The first material 40, second material 42, and third material 44 in the example embodiment of FIG. 2 have the same material characteristics and suitable examples as previously described. In an alternative example embodiment, the sealing gasket 100 lacks a lubricated portion 34 and third material 44.

By forming the spine 60 and sealing member 32 from the second lower durometer material 42 as illustrated in FIG. 2, advantageously this provides for additional flexing and stretching the gasket 100 about the inner pipe member prior to seating the gasket into the corrugations 16 or spigot 19, while the first material 40 is maintains the gripping strength in the legs 66, 68, as previously described.

The annular spine 60 and annular sealing member 32 of the sealing gasket 100 formed from the second material 42 includes an overall diameter slightly smaller than the outer diameter of the spigot 19 or corrugation 16. As a result, the annular sealing gasket 100 during assembly is elastically stretched over the spigot 19 or corrugation 16 such that upon release, the legs 66, 68 snap into the corrugation or spigot. The reduction in size of the sealing gasket 100 diameter is roughly 96% of the crest of the spigot 19 or corrugation 16. Stated another way, for a twelve (12") inch outer most diameter at the spigot 19 or corrugation 16, the diameter of the gasket 100 would be undersized to a diameter of approximately eleven point five (11.5") inches.

The illustrated example embodiment of FIG. 2 advantageously allows for the required flexing of the elements formed or extruded from the second material 42 that are parallel (spine 60 and sealing member 32) with the longitudinal axis x of the annular sealing gasket 100, while allowing the elements formed from the first material 40 (annular legs 66, 68) transverse to the longitudinal axis x of the annular sealing gasket 100 to remain rigid for gripping strength.

In an alternative example embodiment, the flexible nature of the second material is enhanced by adding a flexing agent to the annular sealing gasket's 100 composition during the forming process. For polypropylene, an example of a suitable flexing agent is a commercial product called Vistamaxx manufactured by Exxon Mobile Chemical Company. For polyethylene, a suitable flexing agent is a commercial product called Engage manufactured by Dow Chemical. A suitable formulation in the composition of the second material 42 of the gasket 100 in one example embodiment is approximately 30% flexing agent and 70% rigid plastic having a durometer between 40 and 50 on a Shore D scale.

In a performance test, a gasket 100 having the 70/30 plastic/flexing agent composition as a second material 42 was pressure tested without any welding or permanent connections to the first or second tubular members 12 and 14. That is, the gasket 100 was secured to a twelve inch inner pipe 12 solely by the radial forces "F" compressive forces "C" achieved through the under sizing of the gasket (11.5" inch diameter for 12" inch diameter pipe), the gasket's geometrical configuration, and flexing agent used in its composition of the second material 42. During the test, the gasket 100 exceeded thirty minutes without a leak at a pressure of thirty (30) psi.

Figure 4:
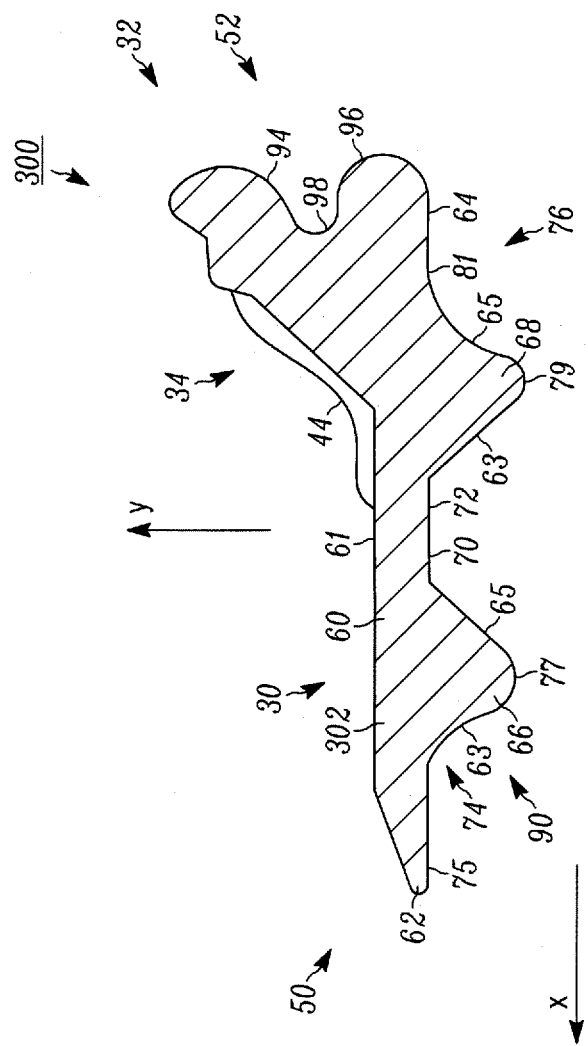
FIG. 4 is a cross-sectional partial perspective view of an annular sealing gasket constructed in accordance with another example embodiment of the present disclosure.

Illustrated in FIG. 4 is an annular sealing gasket 300 constructed in accordance with another example embodiment of the present disclosure. The sealing gasket 300 comprises a single material 302 for forming the entire gasket except for the lubricated portion 44 made from the third material 44. The single material 302 in one example embodiment is the same as the second material 42 and those ranges and suitable examples provided with respect to and described in FIG. 1. In yet another example embodiment the single material 302 is the same as the first material 40 and those ranges and suitable examples provided with respect to and described in FIG. 1. While yet another example embodiment of the annular sealing gasket 300 includes a gasket that is extruded or molded without the lubricated portion 34 from the third material 44.

Figure 6:
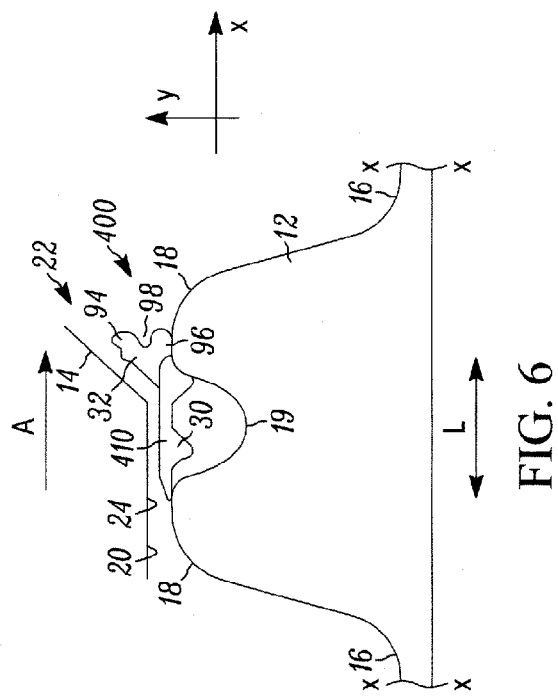
FIG. 6 is a sectioned elevation view of FIG. 5 illustrating a bell of a second pipe member approaching the annular sealing gasket.
Figure 5:
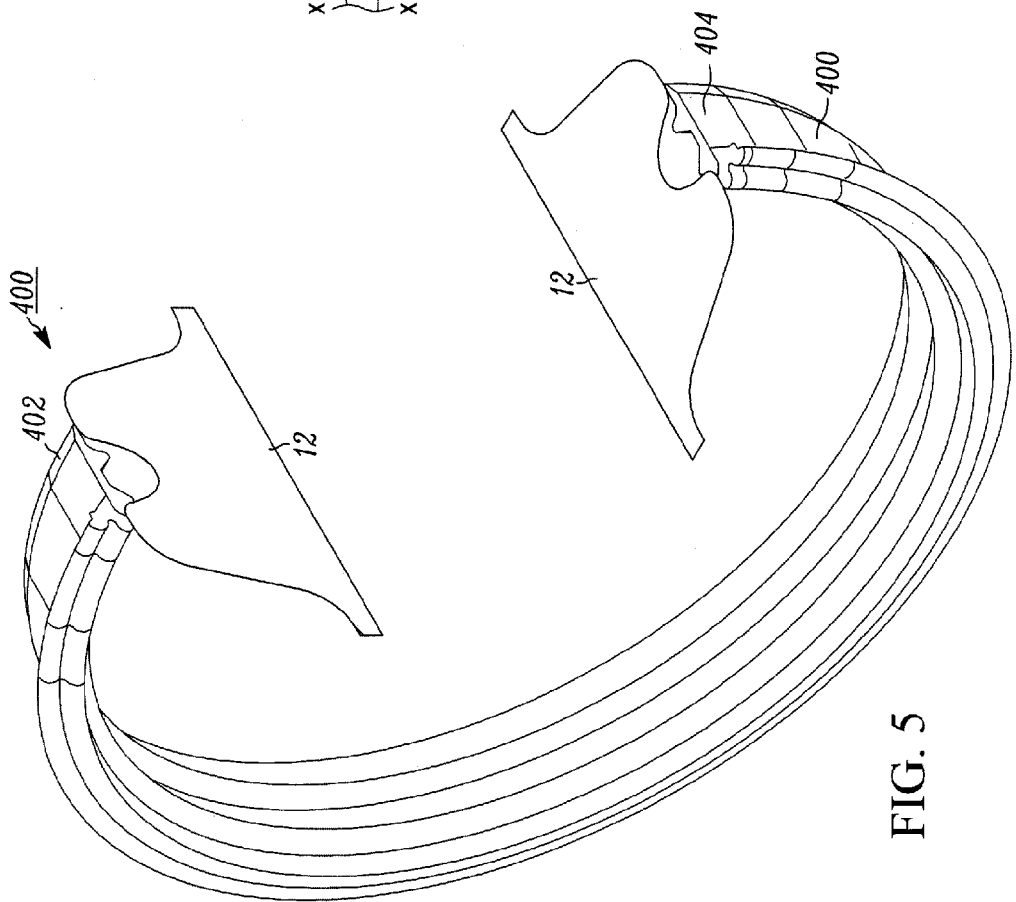
FIG. 5 is a partial perspective view of an annular sealing gasket constructed in accordance with another example embodiment of the present disclosure, the annular sealing gasket being nested in recess of a first pipe member.

FIG. 5 is a partial perspective view of an annular sealing gasket 400 constructed in accordance with another example embodiment of the present disclosure. The annular sealing gasket 400, as illustrated in FIGS. 5 and 6 is nested in a spigot or recess 19 of a first pipe member 12. The sealing gasket 400 provides a fluid-tight seal 499 (see FIG. 11) between the first pipe member 12 and second pipe member 14.

In the illustrated example embodiment of FIGS. 5 and 6, the first pipe member 12 has a plurality of annular grooves or corrugations 16 and annular crowns 18. The second pipe member includes a smooth annular section 20, such as a bell with a mouth 22 for receiving the sealing gasket 400 and first pipe member 12. The first and second tubular members could extend several feet (not shown), but are section in the illustrated example of FIG. 6 at points X. The sealing gasket 400, is anchored in the spigot 19 located within a crown of the crest 18 formed by a single corrugation of the first pipe member 12.

In an alternative embodiment, the sealing gasket 400 is larger in size and spans over the corrugations 16 of the first pipe member 12 between the crowns 18 and forms a seal with the bell of the second pipe member 14. Whether the sealing gasket 400 is positioned within the corrugations 16 or spigot 19, a fluid-tight sealing connection 499 is achieved between the two pipe members 12, 14 when the bell is advanced over the gasket in the direction of the arrow "A".

Once the fluid-tight connection 499 is made between the annular conforming integral gasket 400 and tubular members 12, 14, fluids travel along the integral passage indicated by arrows "L" along the longitudinal axis "x" of the pipe members without leaking or entry of foreign objects or liquids.

Ends 402 and 404 of the gasket 400 shown in FIG. 5 are typically circularly joined by welding the two ends of the gasket together to form a continuous gasket constructed to a specified diameter as a function of the gasket application. In the illustrated example embodiment, the inner diameter of the integral 400 is slightly smaller than the smallest outer diameter profile of the tubular member 12 to provide an interference type compression fit within the corrugation 16 or spigot 19.

Further discussion of the process of welding ends of linear elastomeric gaskets to form the annular gaskets is found in U.S. Patent Publication No. 2007/0181654 filed Aug. 9, 2007 and assigned to SPRINGSEAL® (Streestsboro, Ohio) hereinafter "the '654 Publication") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 400 to be used for that application.

Figure 11:
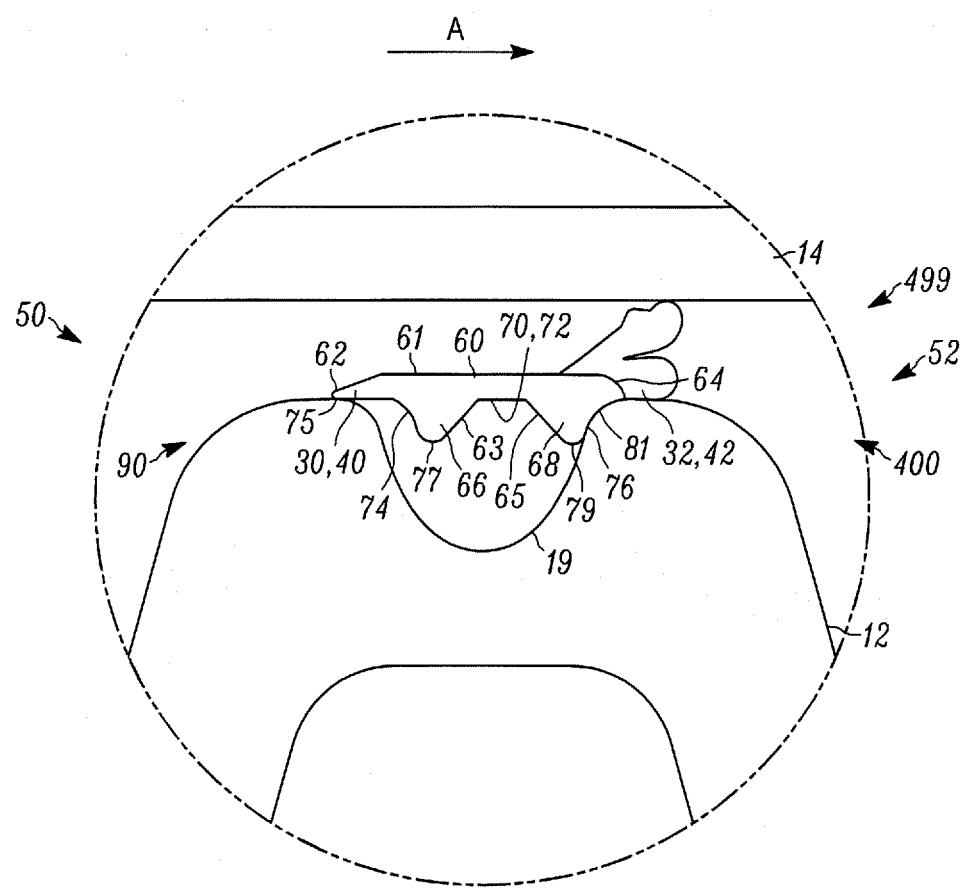
FIG. 11 is an assembled view illustrating the annular sealing gasket of FIG. 5 in a sealed position between first and second pipe members.

In the exemplary embodiment of FIGS. 5, 6, and 11, the annular sealing gasket gasket 400 is formed from two different materials separated into a body region 30 and sealing portion 32. The body region 30 is made from a first material 40 having a relatively hard durometer. An example of suitable material would be an elastomeric material having a durometer range for the body region 30 between 55 durometer on a Shore A scale and a 50 durometer on a Shore D scale. Although elastomeric materials have been discussed, various polymers or rubbers having a durometer between 55 on a Shore A and 50 on a Shore D scale could be used as a suitable first material without departing from the spirit and scope of the claimed disclosure. Yet another suitable example of a first material 40 includes high-density polyethylene ("HDPE").

In an alternative example embodiment, the body region 30, and particularly the first material 40 comprises a durometer value ranging between 70 and 90 on a Shore A scale, and more specifically a Shore A value of 80. Such Shore A value of such range in one example embodiment comprises 80% weight per unit volume $g/cm^3$ ASTM F477 grade material or SANTOPRENE® and 20% polypropylene weight per unit volume $g/cm^3$. And yet in another example embodiment, the second material 40 is formed from only 80% weight per unit volume g/cm³ ASTM F477 grade material or SANTOPRENE® and 20% polypropylene weight per unit volume g/cm³.

The first material 40 range between 70 and 90 on a Shore A scale, and more specifically a Shore A value of 80 provides a more flexible anchor for the body region 30, advantageously allowing longer legs 66, 68 that are needed for larger gaskets. This enables legs 66, 68 for stretching into deeper spigots 19, thus advantageously resisting pull-out or separation.

In a performance test, an annular gasket 400 having the Shore A value ranging between 70 and 90 in composition as a first material 40 was pressure tested without any welding or permanent connections to the first or second tubular members 12 and 14. That is, the gasket 400 was secured to an inner pipe 12 solely by the radial forces "F" compressive forces "C" achieved through the gasket's geometrical configuration and in the composition of the second material 40. During the test, the gasket 400 exceeded thirty minutes without a leak at a pressure of thirty (30) psi or movement of the gasket 400 out of the spigot 19.

The higher tensile strength and lower elongation properties found in the annular gasket 400 comprising the Shore A value ranging between 70 and 90 on a Shore A scale in the first material 40 was further advantageously found to posses resiliency not obtained in conventional gaskets. That is, the gasket 400 is capable of resealing itself against the bell of a piping member after a portion of the gasket has been dislodged by higher water pressure once the higher water pressure subsides. The conventional gaskets having a first material durometer value 40-50 D on a Shore D scale.

The sealing portion 32 is made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could be used as a suitable second material without departing from the spirit and scope of the claimed disclosure.

The sealing gasket 400 includes a leading side 50 and a trailing side 52. In one example embodiment, extending along the leading side of the gasket 400 is a third material (not shown) that forms a portion of the conforming gasket comprising a permanently lubricated composition. The permanently lubricated material could be made from any material having a low coefficient of friction "COF" and more specifically a level of point five 0.5 or less. An example of such suitable material for the lubricated material includes polyethylene or polypropylene, which has an approximate COF of point three (0.3). The lubricated material is relatively thin, having a thickness range between 0.001" to 0.010" inches, preferably ranging between 0.003" to 0.005" inches thick, and is typically applied along a substantial portion of the leading side 50 that would be in contact with the bell 20 of, for example the second tubular member 14 during assembly. The lubricated material can be extruded into the sealing gasket 400 simultaneously with the first and second materials 40, 42, eliminating the need for a secondary operation for applying lubrication to the gasket. Further discussions relating to the application of a permanently lubricated material to a gasket is found in the '905 patent.

In an alternative embodiment, the third material and/or second material 42 are molded to the body region 30 of the first material 40. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material is sprayed onto the leading side 50 of the sealing member 32. An example of a suitable sprayed lubricant includes poly(tetrafluoroethylene) or poly(tetrafluoroethene) (PTFE).

The sealing gasket 400 of FIGS. 5, 6, and 11 further comprises a spine 60 formed within and extending from the body region 30. The spine 60 of the body region 30 comprises a low planer upper surface 61 from a front end 62 to a rear end 64 that is integrated into the sealing portion 32. Part of, and extending radially from the body region 30 are spaced first and second legs 66, 68 respectively. The legs 66 and 68 are inverted cones extending converging away through tapered sides 63, 65 from spine 60, and are spaced by a medial region 70 at a lower surface of the spine.

A front arcuate region 74 is formed about the body region 30 from a front lower surface of the spine 60 to an apex 77 of the first leg 66. A rear arcuate region 76 is formed about the body region 30 from a rear lower surface 81 of the spine to an apex 79 of the second leg 68.

In one example embodiment, the front lower surface 75, medial lower surface 70, and rear lower surface 81 of the spine are all substantially parallel and separated by first and second legs 66, 68, respectively. The substantially linear relationship provides a stiffening structure 90 resistant to lifting out of the corrugation 16 or spigot 19 during assembly of the pipe members 12, 14 with the sealing gasket 10 along a longitudinal direction represented by axis "x" in FIG. 6.

The sealing portion 32 of the gasket 400 comprises upper 94 and lower 96 members separated by a cavity 98. The sealing portion 32 is integrally molded or extruded with the body region. The sealing portion 32 during assembly advantageously forms a fluid-tight seal between the first and second pipe members 12, 14, by their compressing of the upper member 94 toward the lower member 96. This compression sealing of the sealing member 32 is facilitated by the cavity 98, that allows for the relative movement of the upper member 94 toward the lower member 96 as illustrated in the assembled view of FIG. 11.

As the mouth 22 of the bell 20 passes over the gasket 400, the inner surface 24 first engages the gasket at the sealing portion 32. And, in one example embodiment, the inner surface 24 first engages the lubricated portion on the leading side 50 that assists in the interconnection of the pipe members through the reduced friction.

During assembly, the sealing gasket 400 is stretched around the perimeter of the first pipe member 12 for nesting within the spigot 19 as shown in FIG. 6. Or alternatively, the sealing gasket 400 is stretched around the perimeter of the first pipe member 12 for seating in a corrugation 16. The sealing gasket when relaxed is compressed into the corrugation 16 or spigot 19 in the lateral or y-axis direction, causing one or both legs 66, 68 to wedge within the recess 19.

The annular spine 60 and the annular sealing member 32 of the sealing gasket 400 formed from the first and second materials 40, 42 include an overall diameter slightly smaller than the outer diameter of the spigot recess 19 or corrugation 16. As a result, the annular sealing gasket 400 during assembly is elastically stretched over the spigot 19 or corrugation 16 such that upon release, the legs 66, 68 snap into the corrugation or spigot. The reduction in size of the sealing gasket 400 is roughly 96% of the crest of the spigot 19 or corrugation 16. Stated another way, for a twelve (12") inch out most diameter at the spigot 19 or corrugation 16, the diameter of the gasket 400 would be undersized to a diameter of approximately eleven point five (11.5") inches.

In an alternative example embodiment, the flexible nature of the gasket 400 is enhanced by adding a flexing agent 410 to the annular sealing gasket's composition during the extruding process. For polypropylene, an example of a suitable flexing agent is a commercial product called Vistamaxx manufactured by Exxon Mobile Chemical Company. For polyethylene, a suitable flexing agent is a commercial product called Engage manufactured by Dow Chemical. A suitable formulation in the composition of the materials forming the gasket 400 is one example embodiment is approximately 30% by weight per unit volume $g/cm^3$ flexing agent and 70% by weight per unit volume $g/cm^3$ rigid plastic having a durometer between 40 and 50 on a Shore D scale. In another example embodiment, the rigid plastic comprises polypropylene and the flexing agent comprises a propylene-based elastomer. In yet another example embodiment, the body region 30 formed from only rigid plastic consisting of polypropylene and the flexing agent consisting of a propylene-based elastomer.

FIG. 7 is a partial perspective view of an annular sealing gasket 500 constructed in accordance with another example embodiment of the present disclosure. The annular sealing gasket 500, as illustrated in FIGS. 7 and 8 is nested in a spigot or recess 19 of a first pipe member 12. The sealing gasket 500 provides a fluid-tight seal 599 (see FIG. 12) between the first pipe member 12 and second pipe member 14.

In the illustrated example embodiment of FIGS. 7 and 8, the first pipe member 12 has a plurality of annular grooves or corrugations 16 and annular crowns 18. The second pipe member includes a smooth annular section 20, such as a bell with a mouth 22 for receiving the sealing gasket 500 and first pipe member 12. The first and second tubular members could extend several feet (not shown), but are section in the illustrated example of FIG. 8 at points X. The sealing gasket 500, is anchored in the spigot 19 located within a crown of the crest 18 formed by a single corrugation of the first pipe member 12.

In an alternative embodiment, the sealing gasket 500 is larger in size and spans over the corrugations 16 of the first pipe member 12 between the crowns 18 and forms a seal with the bell of the second pipe member 14. Whether the sealing gasket 500 is positioned within the corrugations 16 or spigot 19, a fluid-tight sealing connection 599 is achieved between the two pipe members 12, 14 when the bell is advanced over the gasket in the direction of the arrow "A".

Once the fluid-tight connection 599 is made between the annular conforming integral gasket 500 and tubular members 12, 14, fluids travel along the integral passage indicated by arrows "L" along the longitudinal axis "x" of the pipe members without leaking or entry of foreign objects or liquids.

Ends 502 and 504 of the gasket 500 shown in FIG. 7 are typically circularly joined by welding the two ends of the gasket together to form a continuous gasket constructed to a specified diameter as a function of the gasket application. In the illustrated example embodiment, the inner diameter of the integral 500 is slightly smaller than the smallest outer diameter profile of the tubular member 12 to provide an interference type compression fit within the corrugation 16 or spigot 19.

Further discussion of the process of welding ends of linear elastomeric gaskets to form the annular gaskets is found in U.S. Patent Publication No. 2007/0181654 filed Aug. 9, 2007 and assigned to SPRINGSEAL® (Streestsboro, Ohio) hereinafter "the '654 Publication") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 500 to be used for that application.

Figure 12:
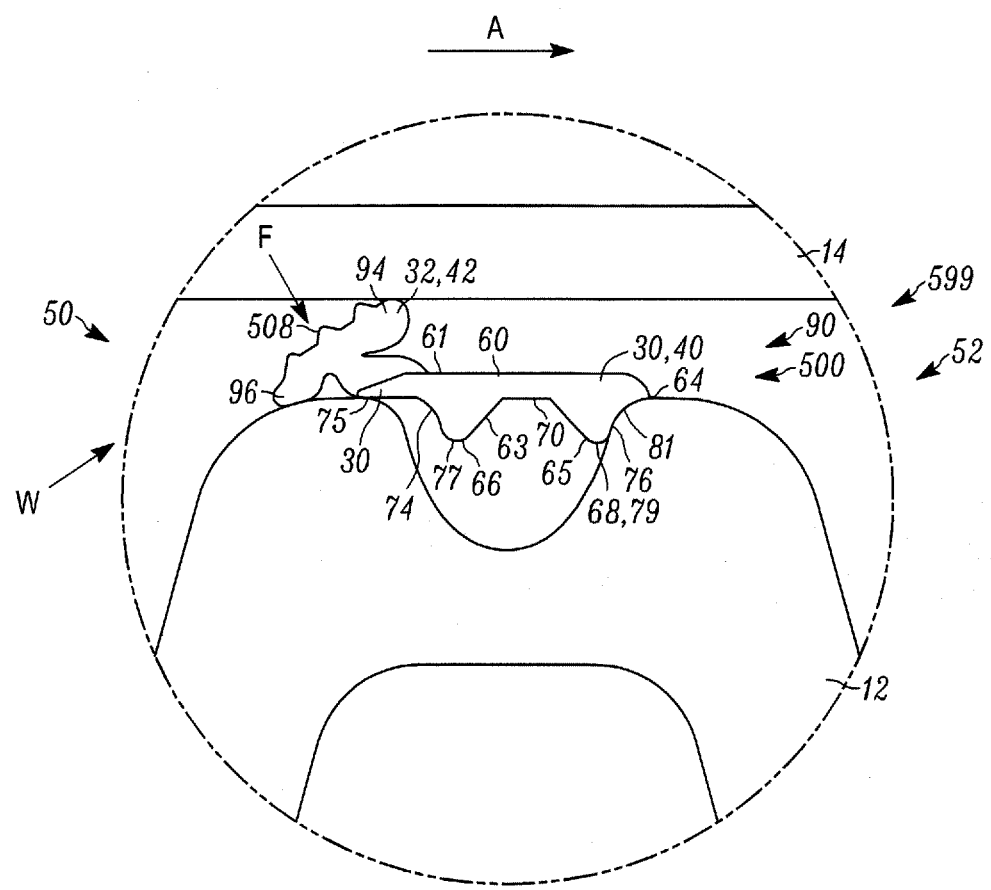
FIG. 12 is an assembled view illustrating the annular sealing gasket of FIG. 7 in a sealed position between first and second pipe members.

In the exemplary embodiment of FIGS. 7, 8, and 12, the annular sealing gasket 500 is formed from two different materials separated into a body region 30 and sealing portion 32. The body region 30 is made from a first material 40 having a relatively hard durometer. An example of suitable material would be an elastomeric material having a durometer range for the body region 30 between 55 durometer on a Shore A scale and a 50 durometer on a Shore D scale. Although elastomeric materials have been discussed, various polymers or rubbers having a durometer between 55 on a Shore A and 50 on a Shore D scale could be used as a suitable first material without departing from the spirit and scope of the claimed disclosure. Yet another suitable example of a first material 40 includes high-density polyethylene ("HDPE").

The sealing portion 32 is made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could be used as a suitable second material without departing from the spirit and scope of the claimed disclosure.

The sealing gasket 500 includes a leading side 50 and a trailing side 52. In one example embodiment, extending along the leading side of the gasket 500 is a third material (not shown) that forms a portion of the conforming gasket comprising a permanently lubricated composition. The permanently lubricated material could be made from any material having a low coefficient of friction "COF" and more specifically a level of point five 0.5 or less. An example of such suitable material for the lubricated material includes polyethylene or polypropylene, which has an approximate COF of point three (0.3). The lubricated material is relatively thin, having a thickness range between 0.001" to 0.010" inches, preferably ranging between 0.003" to 0.005" inches thick, and is typically applied along a substantial portion of the leading side 50 that would be in contact with the bell 20 of, for example the second tubular member 14 during assembly. The lubricated material can be extruded into the sealing gasket 500 simultaneously with the first and second materials 40, 42, eliminating the need for a secondary operation for applying lubrication to the gasket. Further discussions relating to the application of a permanently lubricated material to a gasket is found in the '905 patent.

In an alternative embodiment, the third material and/or second material 42 are molded to the body region 30 of the first material 40. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material is sprayed onto the leading side 50 of the sealing member 32. An example of a suitable sprayed lubricant includes poly(tetrafluoroethylene) or poly(tetrafluoroethene) (PTFE).

The sealing gasket 500 of FIGS. 7, 8, and 12 further comprises a spine 60 formed within and extending from the body region 30. The spine 60 of the body region 30 comprises a low planer upper surface 61 from a front end 62 to a rear end 64. The front end 62 is integrated into the sealing portion 32 by molding or co-extruding. Part of, and extending radially from the body region 30 are spaced first and second legs 66, 68 respectively. The legs 66 and 68 are inverted cones extending converging away through tapered sides 63, 65 from spine 60, and are spaced by a medial region 70 at a lower surface of the spine.

A front arcuate region 74 is formed about the body region 30 from a front lower surface of the spine 60 to an apex 77 of the first leg 66. A rear arcuate region 76 is formed about the body region 30 from a rear lower surface 81 of the spine to an apex 79 of the second leg 68.

In one example embodiment, the front lower surface 75, medial lower surface 70, and rear lower surface 81 of the spine are all substantially parallel and separated by first and second legs 66, 68, respectively. The substantially linear relationship provides a stiffening structure 90 resistant to lifting out of the corrugation 16 or spigot 19 during assembly of the pipe members 12, 14 with the sealing gasket 10 along a longitudinal direction represented by axis "x" in FIG. 8.

The sealing portion 32 of the gasket 500 comprises upper 94 and lower 96 members separated by a cavity 98. The sealing portion 32 is integrally molded or extruded with the body region 30. The sealing portion 32 during assembly advantageously forms a fluid-tight seal between the first and second pipe members 12, 14, by their compressing of the upper member 94 toward the lower member 96. This compression sealing of the sealing member 32 is facilitated by the cavity 98 and transverse inclined surface 508 forming the leading edge of the sealing member as shown by arrow W, that allows for the relative movement of the upper member 94 toward the lower member 96 as illustrated in the assembled view of FIG. 12. The transverse inclined surface at the front of the body region 30 on the leading side 50 forms a novel wedge between the pipe members 12, 14 during assembly, advantageously proving a fluid tight seal. This transverse inclined surface 508 provides a resultant force between the pipe members normal to the surface as shown by force F.

As the mouth 22 of the bell 20 passes over the gasket 500, the inner surface 24 first engages the gasket at the sealing portion 32. And, in one example embodiment, the inner surface 24 first engages the lubricated portion on the leading side 50 that assists in the interconnection of the pipe members through the reduced friction.

During assembly, the sealing gasket 500 is stretched around the perimeter of the first pipe member 12 for nesting within the spigot 19 as shown in FIG. 8. Or alternatively, the sealing gasket 500 is stretched around the perimeter of the first pipe member 12 for seating in a corrugation 16. The sealing gasket when relaxed is compressed into the corrugation 16 or spigot 19 in the lateral or y-axis direction, causing one or both legs 66, 68 to wedge within the recess 19.

The annular spine 60 and the annular sealing member 32 of the sealing gasket 500 formed from the first and second materials 40, 42 include an overall diameter slightly smaller than the outer diameter of the spigot recess 19 or corrugation 16. As a result, the annular sealing gasket 500 during assembly is elastically stretched over the spigot 19 or corrugation 16 such that upon release, the legs 66, 68 snap into the corrugation or spigot. The reduction in size of the sealing gasket 500 is roughly 96% of the crest of the spigot 19 or corrugation 16. Stated another way, for a twelve (12") inch out most diameter at the spigot 19 or corrugation 16, the diameter of the gasket 500 would be undersized to a diameter of approximately eleven point five (11.5") inches.

In an alternative example embodiment, the flexible nature of the gasket 500 is enhanced by adding a flexing agent 510 to the annular sealing gasket's composition during the extruding process. For polypropylene, an example of a suitable flexing agent is a commercial product called Vistamaxx manufactured by Exxon Mobile Chemical Company. For polyethylene, a suitable flexing agent is a commercial product called Engage manufactured by Dow Chemical. A suitable formulation in the composition weight per unit volume ("w/v") of the materials forming the gasket 500 is one example embodiment is approximately 30% by weight per unit volume $g/cm^3$ flexing agent and 70% by weight per unit volume $g/cm^3$ rigid plastic having a durometer between 40 and 50 on a Shore D scale. In another example embodiment, the rigid plastic comprises polypropylene and the flexing agent comprises a propylene-based elastomer. In yet another example embodiment, the body region 30 is formed from only rigid plastic consisting of polypropylene and the flexing agent consisting of a propylene-based elastomer. While yet in another example embodiment, the body region 30 is formed from only rigid plastic consisting of polyethylene and the flexing agent consisting of a polyolefin elastomer.

Figure 10:
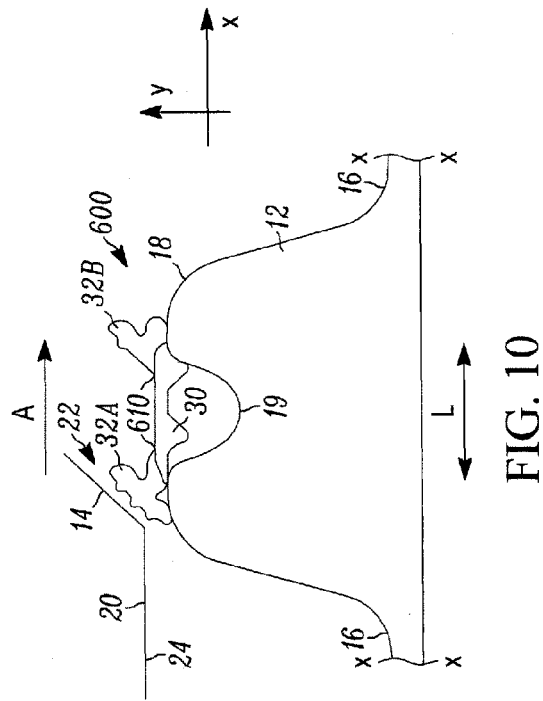
FIG. 10 is a sectioned elevation view of FIG. 9 illustrating a bell of a second pipe member approaching the annular sealing gasket.
Figure 9:
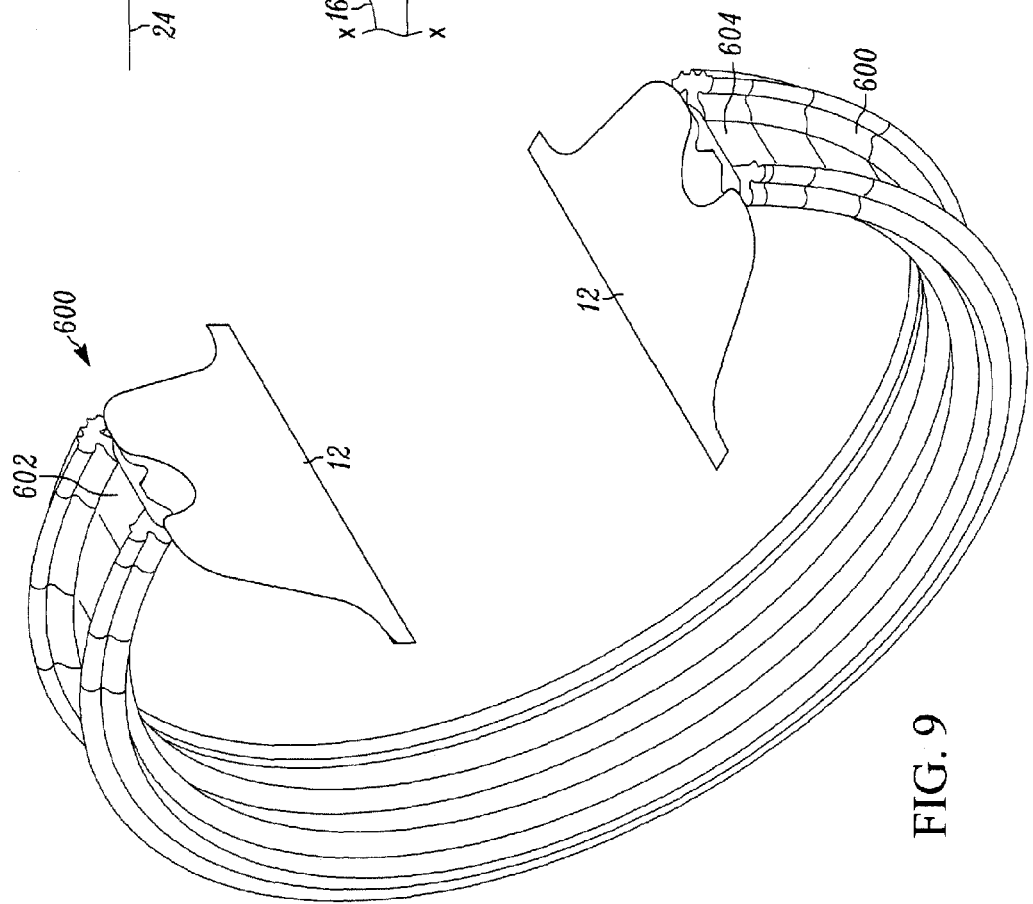
FIG. 9 is a partial perspective view of an annular sealing gasket constructed in accordance with another example embodiment of the present disclosure, the annular sealing gasket being nested in recess of a first pipe member.

FIG. 9 is a partial perspective view of an annular sealing gasket 600 constructed in accordance with another example embodiment of the present disclosure. The annular sealing gasket 600, as illustrated in FIGS. 9 and 10 is nested in a spigot or recess 19 of a first pipe member 12. The sealing gasket 600 provides a fluid-tight seal 699 (see FIG. 13) between the first pipe member 12 and second pipe member 14.

In the illustrated example embodiment of FIGS. 9 and 10, the first pipe member 12 has a plurality of annular grooves or corrugations 16 and annular crowns 18. The second pipe member includes a smooth annular section 20, such as a bell with a mouth 22 for receiving the sealing gasket 600 and first pipe member 12. The first and second tubular members could extend several feet (not shown), but are section in the illustrated example of FIG. 10 at points X. The sealing gasket 600, is anchored in the spigot 19 located within a crown of the crest 18 formed by a single corrugation of the first pipe member 12.

In an alternative embodiment, the sealing gasket 600 is larger in size and spans over the corrugations 16 of the first pipe member 12 between the crowns 18 and forms a seal with the bell of the second pipe member 14. Whether the sealing gasket 600 is positioned within the corrugations 16 or spigot 19, a fluid-tight sealing connection 699 is achieved between the two pipe members 12, 14 when the bell is advanced over the gasket in the direction of the arrow "A".

Once the fluid-tight connection 699 is made between the annular conforming integral gasket 600 and tubular members 12, 14, fluids travel along the integral passage indicated by arrows "L" along the longitudinal axis "x" of the pipe members without leaking or entry of foreign objects or liquids.

Ends 602 and 604 of the gasket 600 shown in FIG. 9 are typically circularly joined by welding the two ends of the gasket together to form a continuous gasket constructed to a specified diameter as a function of the gasket application. In the illustrated example embodiment, the inner diameter of the integral 600 is slightly smaller than the smallest outer diameter profile of the tubular member 12 to provide an interference type compression fit within the corrugation 16 or spigot 19.

Further discussion of the process of welding ends of linear elastomeric gaskets to form the annular gaskets is found in U.S. Patent Publication No. 2007/0181654 filed Aug. 9, 2007 and assigned to SPRINGSEAL® (Streestsboro, Ohio) hereinafter "the '654 Publication") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 600 to be used for that application.

Figure 13:
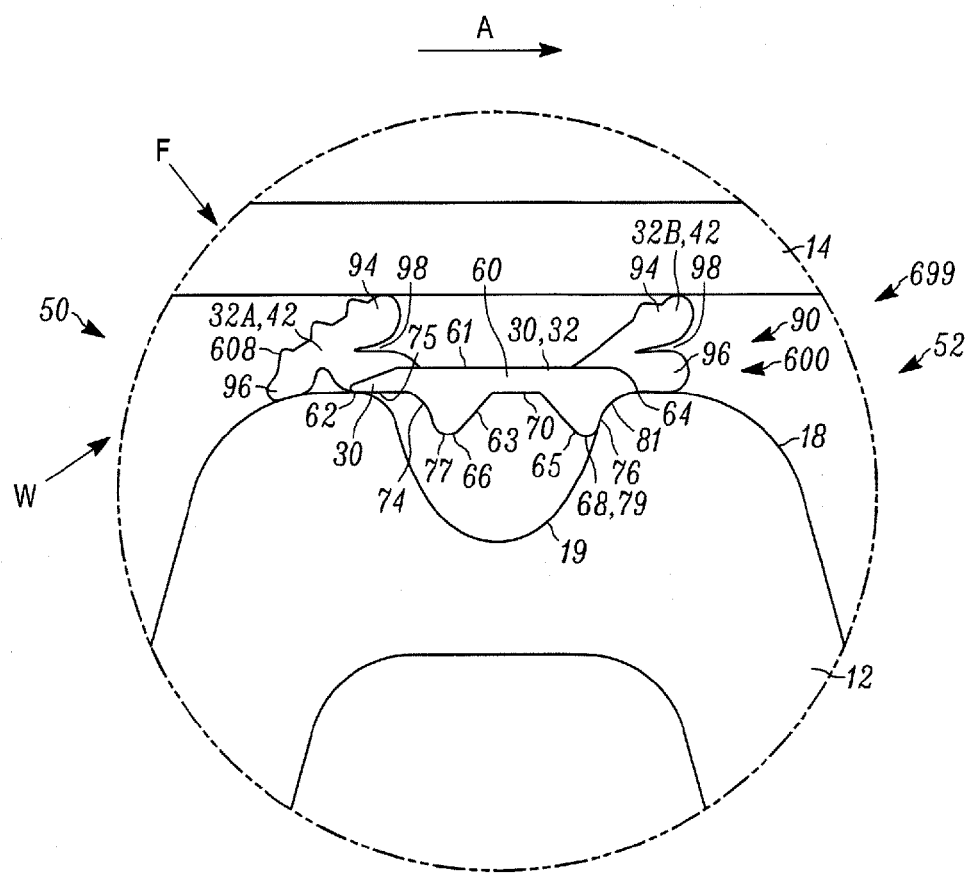
FIG. 13 is an assembled view illustrating the annular sealing gasket of FIG. 9 in a sealed position between first and second pipe members.

In the exemplary embodiment of FIGS. 9, 10, and 13, the annular sealing gasket 600 is formed from two different materials separated into a body region 30 and first and second sealing portions 32A and 32B. The body region 30 is made from a first material 40 having a relatively hard durometer. An example of suitable material would be an elastomeric material having a durometer range for the body region 30 between 55 durometer on a Shore A scale and a 50 durometer on a Shore D scale. Although elastomeric materials have been discussed, various polymers or rubbers having a durometer between 55 on a Shore A and 50 on a Shore D scale could be used as a suitable first material without departing from the spirit and scope of the claimed disclosure. Yet another suitable example of a first material 40 includes high-density polyethylene ("HDPE").

The sealing portions 32A, 32B are made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could be used as a suitable second material without departing from the spirit and scope of the claimed disclosure.

The sealing gasket 600 includes a leading side 50 and a trailing side 52. In one example embodiment, extending along the leading side of the gasket 600 is a third material (not shown) that forms a portion of the conforming gasket comprising a permanently lubricated composition. The permanently lubricated material could be made from any material having a low coefficient of friction "COF" and more specifically a level of point five 0.5 or less. An example of such suitable material for the lubricated material includes polyethylene or polypropylene, which has an approximate COF of point three (0.3). The lubricated material is relatively thin, having a thickness range between 0.001" to 0.010" inches, preferably ranging between 0.003" to 0.005" inches thick, and is typically applied along a substantial portion of the leading side 50 that would be in contact with the bell 20 of, for example the second tubular member 14 during assembly. The lubricated material can be extruded into the sealing gasket 600 simultaneously with the first and second materials 40, 42, eliminating the need for a secondary operation for applying lubrication to the gasket. Further discussions relating to the application of a permanently lubricated material to a gasket is found in the '905 patent.

In an alternative embodiment, the third material and/or second material 42 are molded to the body region 30 of the first material 40. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material is sprayed onto the leading side 50 of the sealing members 32A and 32B. An example of a suitable sprayed lubricant includes poly(tetrafluoroethylene) or poly (tetrafluoroethene) (PTFE).

The sealing gasket 600 of FIGS. 9, 10, and 13 further comprises a spine 60 formed within and extending from the body region 30. The spine 60 of the body region 30 comprises a low planer upper surface 61 from a front end 62 to a rear end 64. The front end 62 and rear end 64 are integrated into first and second sealing portions 32A, 32B, respectively by molding or co-extruding. Part of, and extending radially from the body region 30 are spaced first and second legs 66, 68 respectively. The legs 66 and 68 are inverted cones extending converging away through tapered sides 63, 65 from spine 60, and are spaced by a medial region 70 at a lower surface of the spine.

A front arcuate region 74 is formed about the body region 30 from a front lower surface of the spine 60 to an apex 77 of the first leg 66. A rear arcuate region 76 is formed about the body region 30 from a rear lower surface 81 of the spine to an apex 79 of the second leg 68.

In one example embodiment, the front lower surface 75, medial lower surface 70, and rear lower surface 81 of the spine are all substantially parallel and separated by first and second legs 66, 68, respectively. The substantially linear relationship provides a stiffening structure 90 resistant to lifting out of the corrugation 16 or spigot 19 during assembly of the pipe members 12, 14 with the sealing gasket 10 along a longitudinal direction represented by axis "x" in FIG. 10.

The first and second sealing portions 32A and 32B of the gasket 600 comprises upper 94 and lower 96 members separated by a cavity 98. The sealing portion 32 is integrally molded or extruded with the body region 30. The sealing portions 32A and 32B during assembly advantageously forms a fluid-tight seal between the first and second pipe members 12, 14, by their compressing of the upper member 94 toward the lower member 96. This compression sealing of the sealing members 32 is facilitated by the cavities 98 and transverse inclined surface 608 forming the leading edge of the first sealing member 32A as shown by arrow W, that allows for the relative movement of the upper member 94 toward the lower member 96 as illustrated in the assembled view of FIG. 13. The transverse inclined surface at the front of the body region 30 on the leading side 50 along with dual sealing members 32A and 32B separated by body region 30 forms a novel wedge between the pipe members 12, 14 during assembly, advantageously proving a fluid tight seal. This transverse inclined surface 608 provides a resultant force between the pipe members normal to the surface as shown by force F.

As the mouth 22 of the bell 20 passes over the gasket 600, the inner surface 24 first engages the gasket at the sealing portions 32A and 32B. And, in one example embodiment, the inner surface 24 first engages the lubricated portion on the leading side 50 of either or both of the sealing members 32A and 32B that assists in the interconnection of the pipe members through the reduced friction.

During assembly, the sealing gasket 600 is stretched around the perimeter of the first pipe member 12 for nesting within the spigot 19 as shown in FIG. 10. Or alternatively, the sealing gasket 600 is stretched around the perimeter of the first pipe member 12 for seating in a corrugation 16. The sealing gasket when relaxed is compressed into the corrugation 16 or spigot 19 in the lateral or y-axis direction, causing one or both legs 66, 68 to wedge within the recess 19.

The annular spine 60 and the annular sealing members 32 of the sealing gasket 600 formed from the first and second materials 40, 42 includes an overall diameter slightly smaller than the outer diameter of the spigot recess 19 or corrugation 16. As a result, the annular sealing gasket 600 during assembly is elastically stretched over the spigot 19 or corrugation 16 such that upon release, the legs 66, 68 snap into the corrugation or spigot. The reduction in size of the sealing gasket 600 is roughly 96% of the crest of the spigot 19 or corrugation 16. Stated another way, for a twelve (12") inch out most diameter at the spigot 19 or corrugation 16, the diameter of the gasket 600 would be undersized to a diameter of approximately eleven point five (11.5") inches.

In an alternative example embodiment, the flexible nature of the gasket 600 is enhanced by adding a flexing agent 610 to the annular sealing gasket's composition during the extruding process. For polypropylene, an example of a suitable flexing agent is a commercial product called Vistamaxx manufactured by Exxon Mobile Chemical Company. For polyethylene, a suitable flexing agent is a commercial product called Engage manufactured by Dow Chemical. A suitable formulation in the composition of the materials forming the gasket 600 is one example embodiment is approximately 30% by weight per unit volume $g/cm^3$ flexing agent and 70% by weight per unit volume $g/cm^3$ rigid plastic having a durometer between 40 and 50 on a Shore D scale. In another example embodiment, the rigid plastic comprises polypropylene and the flexing agent comprises a propylene-based elastomer. In yet another example embodiment, the body region 30 formed from only rigid plastic consisting of polypropylene and the flexing agent consisting of a propylene-based elastomer.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An annular sealing gasket for forming a sealing connection between a first tubular member and a second tubular member during use, the annular sealing gasket comprising:
    a flexible sealing portion adapted to form a sealing connection between the first tubular member and a second tubular member during use, the flexible sealing portion including rounded upper and lower members spaced apart by a cavity; and
    a body region adapted for supporting said flexible sealing portion and anchoring the annular sealing gasket to a secured connection, the body region having spaced first and second conical legs extending convergingly away from said body region in a radially inward direction and transversely from said flexible sealing portion, each first and second leg including a pair of tapered sides, wherein the body region includes coplanar first and second lower surfaces separated by the first leg, the second lower surface separating the first leg from the second leg, said sealing portion exclusively extending radially outward of the coplanar first and second lower surfaces from an upper surface extending parallel to the first and second lower surfaces, wherein said body region and said first and second legs are formed from a first material having a first durometer and said flexible sealing portion is made from a second material having a second durometer such that said first durometer is higher than said second durometer.

2. The annular sealing gasket of claim 1 wherein said first material comprises approximately 70 percent w/v rigid plastic and 30 percent w/v flexing agent.

3. The annular gasket of claim 2 wherein said rigid plastic comprises polypropylene and said flexing agent comprises a propylene-based elastomer.

4. The annular gasket of claim 2 wherein said rigid plastic consist of polypropylene and said flexing agent consists of a propylene-based elastomer.

5. The annular gasket of claim 2 wherein said rigid plastic comprises polyethylene and said flexing agent comprises a polyolefin elastomer.

6. The annular gasket of claim 2 wherein said rigid plastic consist of polyethylene and said flexing agent consists of a polyolefin elastomer.

7. The annular gasket of claim 1 wherein said first and second conical legs are of equal radial length.

8. The annular gasket of claim 1 wherein said first material comprises a durometer value between 70 and 90 on a Shore A scale.

9. The annular gasket of claim 1 wherein said first material comprises a durometer value between 70 and 90 on a Shore A scale and said second material comprises a durometer value between 40 and 60 on a Shore A scale.

10. The annular gasket of claim 8 wherein said first material comprises a durometer value of approximately 80 on a Shore A scale.

11. The annular gasket of claim 1 further comprising a stiffening structure including the coplanar first and second lower surfaces.

12. The annular gasket of claim 11 further comprising a front end comprising said first lower surface and a front upper surface, wherein said front end is asymmetrical.

13. The annular gasket of claim 12 wherein said first lower surface is parallel with an upper surface of the body region and said front upper surface is transverse to said first lower surface.

14. An annular sealing gasket for forming a sealing connection between a first tubular member and a second tubular member, the annular sealing gasket comprising:
    a flexible sealing portion adapted to form a sealing connection between a first tubular member and a second tubular member, the flexible sealing portion including rounded upper and lower members spaced apart by a cavity; and
    a body region adapted for supporting said flexible sealing portion and anchoring the annular sealing gasket to a secured connection within a recess of one of the first and second tubular members during assembly, the body region having spaced first and second conical legs extending away from said body region in a radially inward direction, each first and second leg including a pair of tapered sides, wherein the body region includes coplanar first and second lower surfaces separated by the first leg, the second lower surface separating the first leg from the second leg, said sealing portion exclusively extending radially outward of the coplanar first and second lower surfaces from an upper surface extending parallel to the first and second lower surfaces, wherein said body region and said first and second legs are formed from a first material having a first durometer and said flexible sealing portion is made from a second material having a second durometer such that said first durometer is higher than said second durometer;

the annular sealing gasket having a leading side that is covered first by the other of the first and second tubular members during assembly, the leading side of said annular sealing gasket being located opposite a trailing side, said flexible sealing portion being one of extruded and molded into said body region along said leading side.

15. The annular sealing gasket of claim 14 wherein said sealing portion comprises a transverse inclined surface forming the leading edge of the sealing gasket.

16. The annular gasket of claim 14 wherein said first and second conical legs are of equal radial length.

17. The annular gasket of claim 14 wherein said first material comprises a durometer value between 70 and 90 on a Shore A scale.

18. The annular gasket of claim 14 wherein said first material comprises a durometer value between 70 and 90 on a Shore A scale and said second material comprises a durometer value between 40 and 60 on a Shore A scale.

19. The annular gasket of claim 17 wherein said first material comprises a durometer value of approximately 80 on a Shore A scale.

20. The annular gasket of claim 14 further comprising a stiffening structure including the coplanar first and second lower surfaces.

21. An annular sealing gasket for forming a sealing connection between a first tubular member and a second tubular member during use the annular sealing gasket comprising:

a flexible sealing portion adapted to form a sealing connection between the first tubular member and the second tubular member during use, the flexible sealing portion including rounded upper and lower members spaced apart by a cavity; and a body region adapted for supporting said flexible sealing portion and anchoring the annular sealing gasket to a secured connection, the body region having spaced first and second conical legs each having a rounded apex and extending convergingly away from said body region in a radially inward direction and transversely from said flexible sealing portion, wherein a planar surface extends from said first leg to said second leg, each first and second leg including a pair of tapered sides, wherein the body region includes coplanar first and second lower surfaces separated by the first leg, the second lower surface separating the first leg from the second leg, said sealing portion exclusively extending radially outward of the coplanar first and second lower surfaces from an upper surface extending parallel to the first and second lower surfaces, wherein said body region and said first and second legs are formed from a first material having a first durometer and said flexible sealing portion is made from a second material having a second durometer such that said first durometer is higher than said second durometer.

* * * * *